United States Patent
Truitt

(10) Patent No.: US 6,820,542 B1
(45) Date of Patent: Nov. 23, 2004

(54) LEAF COMPACTOR AND BALER

(76) Inventor: Bobby L. Truitt, 107 Roberta Rd. SE., Huntsville, AL (US) 35802

( * ) Notice: Subject to any disclaimer, the term of this patent is extended or adjusted under 35 U.S.C. 154(b) by 0 days.

(21) Appl. No.: 10/371,729

(22) Filed: Feb. 21, 2003

Related U.S. Application Data

(63) Continuation-in-part of application No. 09/971,402, filed on Oct. 5, 2001, now abandoned.

(51) Int. Cl.$^7$ .......................... B65B 13/20; B02C 19/00
(52) U.S. Cl. .............................. 100/3; 100/15; 100/87; 100/96; 100/100; 100/102; 241/25; 241/101.2; 241/236; 56/341; 15/4; 15/83
(58) Field of Search .......................... 100/3, 5, 15, 25, 100/88, 96, 98 R, 189, 102, 94, 100, 70 A, 87, 95; 241/101.2, 25, 223, 236; 56/341, 342; 15/4, 83

(56) References Cited

U.S. PATENT DOCUMENTS

| | | | |
|---|---|---|---|
| 2,415,910 A | 2/1947 | Roes | |
| 3,107,475 A | 10/1963 | Gustafson | |
| 3,229,320 A | 1/1966 | Cymara | |
| 3,474,973 A | 10/1969 | Gundlach | |
| 3,641,754 A | 2/1972 | Anstee | |
| 3,736,736 A | 6/1973 | Myers | |
| 3,895,573 A | 7/1975 | Phillips et al. | |
| 3,911,519 A | * 10/1975 | Anlas et al. .................... | 15/83 |
| 3,911,933 A | 10/1975 | Crisp et al. | |
| 3,964,719 A | 6/1976 | Hally et al. | |
| 4,367,622 A | * 1/1983 | Aron et al. .................... | 56/364 |
| 4,809,380 A | 3/1989 | VanGinhoven et al. | |
| 4,825,495 A | 5/1989 | VanGinhoven et al. | |
| 4,914,774 A | 4/1990 | Sheehan et al. | |
| 5,195,429 A | 3/1993 | Firpo | |
| 5,255,501 A | 10/1993 | McWilliams | |
| 5,343,679 A | 9/1994 | Cymara | |
| 5,365,836 A | * 11/1994 | Campbell ...................... | 100/5 |
| 5,634,396 A | 6/1997 | Isobe et al. | |
| 6,263,649 B1 | 7/2001 | Gross et al. | |
| 6,263,650 B1 | * 7/2001 | Deutsch et al. .......... | 56/16.4 B |
| 6,591,743 B2 | * 7/2003 | Deutsch et al. ................ | 100/8 |

\* cited by examiner

*Primary Examiner*—Allen Ostrager
*Assistant Examiner*—Jimmy Nguyen
(74) *Attorney, Agent, or Firm*—Lanier Ford Shaver & Payne P.C.

(57) ABSTRACT

An apparatus 10 for compacting and baling leaves, grass clippings, sticks, pine straw and other debris on lawns, yards, or fields is provided. The apparatus 10 may have diagonal brushes 26 to gather debris for processing though a crusher 28, a conveyor belt 30 to transport the crushed debris, and a baler 32 to compact and bale the debris. The baler 32 may compact the debris by rotating the debris in a continuous band 52, into which baling material 72 may be inserted to bale the debris. Alternatively, the debris may be gathered and feed into a crusher 28 that deposits the crushed debris directly into the baler 32 for compacting and baling. Further still, the apparatus 10 may gather the debris with brushes 26 and feed it onto a conveyor mechanism 30 that then introduces it into a crusher 28. The crushed debris may then be feed into a baling mechanism 32 that compacts and bales the debris for easy removal and disposal. In its various embodiments, the present invention may be connected to a prime mover 20 or alternatively connected to a portable base with a motor for driving the device 10.

18 Claims, 16 Drawing Sheets

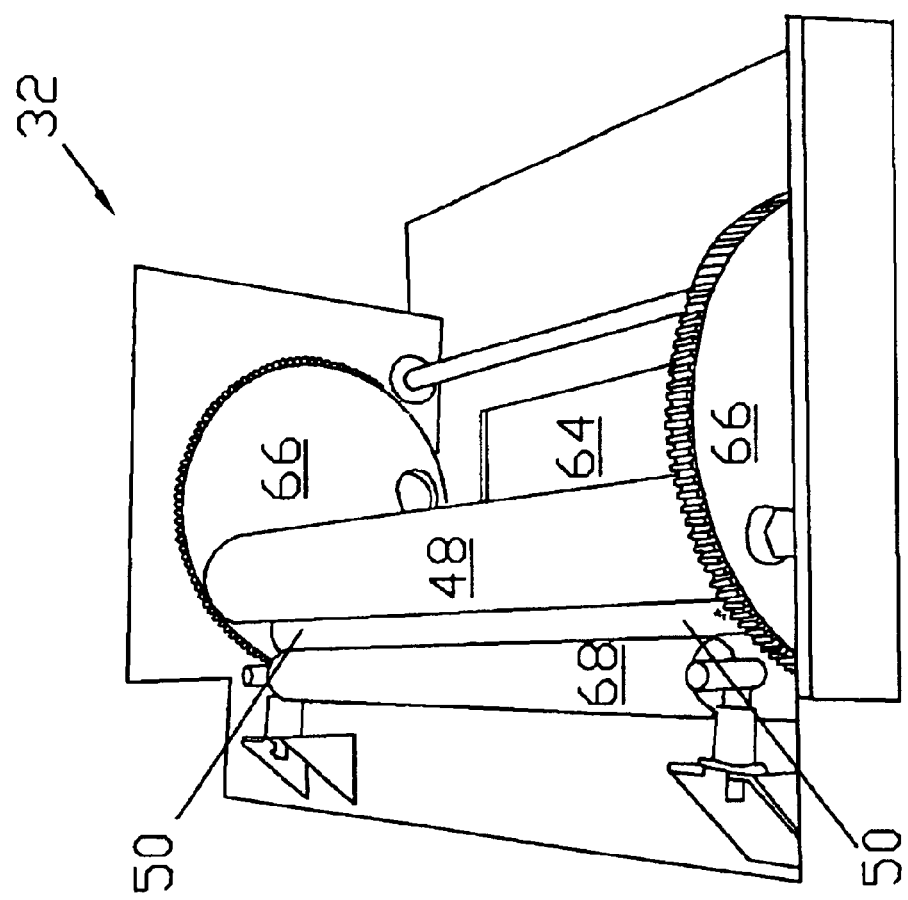

LEAF COMPACTOR AND BALER

REFERENCE TO RELATED APPLICATIONS

This application is a Continuation-in-Part of and claims priority to Non-Provisional Patent Application, U.S. Ser. No., 09/971,402, entitled "Leaf Compactor and Baler" filed Oct. 5, 2001, now abandoned, which is fully incorporated herein by reference.

BACKGROUND OF INVENTION

1. Field of Invention

This invention relates to leaf gathering machines and to leaf balers and, more particularly, to an apparatus that will gather, crush, compress, and bale leaves and other debris.

2. Technical Background

The gathering and disposal of leaves is an essential activity to maintain the cleanliness and appearance of a variety of public lands, golf courses, and homes, including lawns and natural areas. Leaf gathering and disposal usually occurs in the fall in the northern hemisphere but can occur at other times of the year if plant-like material accumulates, such as pine cones, pine needles, tall grasses, shrubbery, weeds, and the like. Leaves and other related yard debris are usually separated from garbage and general household trash. Leaves and other yard debris can be used for composting so that landfill space is reserved for trash that is not suitable for composting. A common method of gathering and disposing of leaves by homeowners is to rake the leaves and to place them into trash bags, which is a burdensome chore. Raking leaves, picking them up, and placing them in bags is stressful work and is often beyond the ability of many older individuals or individuals with compromised health.

In some communities, the homeowners can rake leaves into a pile on the side of the street. Generally the leaves and other yard materials are deposited in a windrow adjacent to or on the edge of the street. A vehicle with a collection bin and a vacuum pickup the leaves and yard debris and hold these materials in a bin. The vacuum pickup is usually manipulated manually while gathering leaves. The bin tends to fill rapidly because in this process the leaves are not compressed. When the bin is fill, the machine stops gathering leaves and moves to a disposal site or transfer station where the bin is unloaded. During transport and unloading, the machine is not available to pickup leaves, which limits the rate at which leaves can be picked up and removed throughout the day.

Full capacity bagger attachments are known for use on lawn mowing machines. Some of these employ an auger to feed leaf material into a bag and compress the material in the bag. These mowing machines have limited capacity to pickup leaves. They are slow and frequently plug with leaves. Once the bag is full, the mowing machine is stopped, the operator dismounts from the machine, closes the bag manually, removes the filled bag from the machines, mounts an empty bag in position to be filled, and then returns to the machine to resume the leaf bagging operation. The stationary bagging machines and the bagger attachments for lawn mowing machines fill relatively small bags. All bags are handled manually after they are filled. The major drawbacks of these bagging machine systems are the cost of the bags and the fact that the systems can be relatively labor intensive.

Full capacity machines are known which will gather leaves, shred the leaves, deposit the leaves to an auger, and the auger will direct the leaves to a bag. In these machines, the leaf gathering mechanism is a paddle like device and the shredder employs knife-like elements. The drawbacks of devices such as these are that sticks and similar debris amongst the leaves can cause the gathering mechanism or the shredder to jam. Sticks and the like can also jam between the auger and its housing. The present invention overcomes these drawbacks by providing a leaf gathering, crushing, compacting, and baling system which does not require the use of an auger and will bale the leaves automatically without the use of a bag.

SUMMARY OF THE INVENTION

The present invention recognizes and addresses various of the foregoing limitations and drawbacks, and others, concerning leaf and debris gathering and bagging apparatuses. Therefore, the present invention is directed to a leaf gathering and baling apparatus which compacts the leaves and related debris by crushing and compressing the debris.

A first advantage of the present invention is that it crushes leaves, sticks, pine straw, pinecones and related debris on lawns, yards, and fields. Yet another advantage of the present invention is that it has unlimited capacity because it continuously bales and eliminates leaves. In such context, the present invention produces bales that can be conveniently lifted and carried.

Still another advantage of the present invention is that it automatically gathers leaves thereby avoiding raking. Further, another advantage of the present invention is that it is hydraulically driven. Still further, another advantage of the present invention is that it does not have augers which require a housing.

Another advantage of the present invention is that it is removably attachable to a prime mover. Finally, another advantage of the present invention is that can be used without the compactor and baler to produce mulch.

In one exemplary embodiment, there may be provided a gathering and baling apparatus capable of crushing sticks and similar material associated with the leaves. The apparatus is reversibly attached to a prime mover that can move the apparatus across lawns and fields as needed. In a first embodiment of the present invention, the front portion of the apparatus may have brushes extending diagonally at an angle to the centerline of the apparatus. The brushes roll inwardly on their bottom edges to gather leaves towards the front of the apparatus. The roller brushes direct and lift the leaves to a crusher. The crusher has one or more pairs of crushing rollers. Each crushing roller in a pair has crushing vanes and the crushing vane of one crushing roller interdigitate or meshes with the crushing vane of the other crushing roller. The crushing rollers are driven by a motor to rotate towards one another so that the leaves and sticks and related debris from the brushes will be fed into the crushing roller pair and be crushed by the crushing vanes as the crushing rollers rotate. Crushed material can pass through one or more additional pairs of like crushing rollers, but will eventually fall and be pushed to the bottom of the crusher where it will be forced out of the crusher by a similar pair of crushing rollers with crushing vanes and be deposited onto a conveyor mechanism. The conveyor mechanism moves the crushed debris to a baler assembly. The baler assembly has two compacting rollers contained within a continuous band. One of the baler assembly compacting rollers is fixed and the other compacting roller is movable. When the movable compacting roller is moved away from the fixed compacting roller, the band can receive the crushed debris from the conveyor mechanism. Once the crushed debris is deposited on the band, the adjustable compacting roller is moved toward the fixed compacting roller, thereby compressing the debris further. The compacting rollers are rotated in the same direction by motors, causing the crushed compressed debris to rotate within the band. As the crushed debris rotates within the band, baling material such as paper is inserted between the compacting rollers and is directed by the moving band around the rotating debris. The paper tightly encircles the rotating debris, thus baling it. The movable roller within the compactor is moved away from the fixed roller, the baler assembly is rotated, and the baled debris is expelled. This sequence of gathering, crushing, conveying, compacting, and baling debris is produced continuously and automatically as the apparatus moves forward gathering leaves.

In a second exemplary embodiment of the present invention, the front portion of the apparatus may have brushes extending diagonally at an angle to the centerline of the apparatus. The brushes roll inwardly on their bottom edges to gather leaves towards the front of the apparatus. The roller brushes direct and lift the leaves to a conveyor mechanism. The conveyor mechanism moves the crushed debris to a crusher. The crusher has one or more pairs of crushing rollers. Each crushing roller in a pair has crushing vanes and the crushing vane of one crushing roller interdigitate or meshes with the crushing vane of the other crushing roller. The crushing rollers are driven by a motor to rotate towards one another so that the leaves and sticks and related debris from the brushes will be fed into the crushing roller pair and be crushed by the crushing vanes as the crushing rollers rotate. Crushed material can pass through one or more additional pairs of like crushing rollers, but will eventually fall and be pushed to the bottom of the crusher where it will be forced out of the crusher by a similar pair of crushing rollers with crushing vanes and be deposited into a baler assembly. The baler assembly has two compacting rollers contained within a continuous band. One of the baler assembly compacting rollers is fixed and the other compacting roller is movable. When the movable compacting roller is moved away from the fixed compacting roller, the band can receive the crushed debris from the conveyor mechanism. Once the crushed debris is deposited on the band, the adjustable compacting roller is moved toward the fixed compacting roller, thereby compressing the debris further. The compacting rollers are rotated in the same direction by motors, causing the crushed compressed debris to rotate within the band. As the crushed debris rotates within the band, baling material, such as paper is inserted between the compacting rollers and is directed by the moving band around the rotating debris. The paper tightly encircles the rotating debris, thus baling it. The movable roller within the compactor is moved away from the fixed roller, the baler assembly is rotated, and the baled debris is expelled. This sequence of gathering, conveying, crushing, compacting, and baling debris is produced continuously and automatically as the apparatus moves forward gathering leaves.

In a third exemplary embodiment of the present invention, the apparatus is attached to a prime mover, such as a lawn mower base. Unlike the other alternative embodiments, the present embodiment lacks brushes extending diagonally at an angle to the centerline of the apparatus for the collection of debris. In the present embodiment, debris is manually introduced by the operator into the crusher. The crusher has one or more pairs of crushing rollers. Each crushing roller in a pair has crushing vanes and the crushing vane of one crushing roller interdigitate or meshes with the crushing vane of the other crushing roller. The crushing rollers are driven by a motor to rotate towards one another so that the leaves and sticks and related debris from the brushes will be fed into the crushing roller pair and be crushed by the crushing vanes as the crushing rollers rotate. Crushed material can pass through one or more additional pairs of like crushing rollers, but will eventually fall and be pushed to the bottom of the crusher where it will be forced out of the crusher by a similar pair of crushing rollers with crushing vanes and be deposited into a baler assembly. The baler assembly has two compacting rollers contained within a continuous band. One of the baler assembly compacting rollers is fixed and the other compacting roller is movable. When the movable compacting roller is moved away from the fixed compacting roller, the band can receive the crushed debris from the conveyor mechanism. Once the crushed debris is deposited on the band, the adjustable compacting roller is moved toward the fixed compacting roller, thereby compressing the debris further. The compacting rollers are rotated in the same direction by motors, causing the crushed compressed debris to rotate within the band. As the crushed debris rotates within the band, baling material, such as paper is inserted between the compacting rollers and is directed by the moving band around the rotating debris. The paper tightly encircles the rotating debris, thus baling it. The movable roller within the compactor is moved away from the fixed roller, the baler assembly is rotated, and the baled debris is expelled. The crushing, compacting, and baling sequence is guided by the user during the operation of the apparatus. The present embodiment is significantly smaller in size than the alternative embodiments and while motor driven is primarily manual in its continuous operation.

Additional objects and advantages of the invention are set forth in, or will be apparent to those of ordinary skill in the art from the detailed description as follows. Also, it should be further appreciated that modifications and variations to the specifically illustrated and discussed features and materials hereof may be-practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivalents (including combinations of features or configurations thereof not expressly shown in the figures or stated in the detailed description).

These and other features, aspects and advantages of the present invention will become better understood with reference to the following descriptions and appended claims. The accompanying drawings, which are incorporated in and constitute a part of this specification, illustrate an embodiment of the invention and, together with the descriptions, serve to explain the principles of the invention.

BRIEF DESCRIPTION OF THE DRAWINGS

A fill and enabling disclosure of the present invention, including the best mode thereof, directed to one of ordinary skill in the art, is set forth in the specification, which makes reference to the appended figures, in which:

FIG. 8B is a right side perspective view of the baler assembly of the present invention in a closed position as seen without the continuous baling band;

Figure 1:
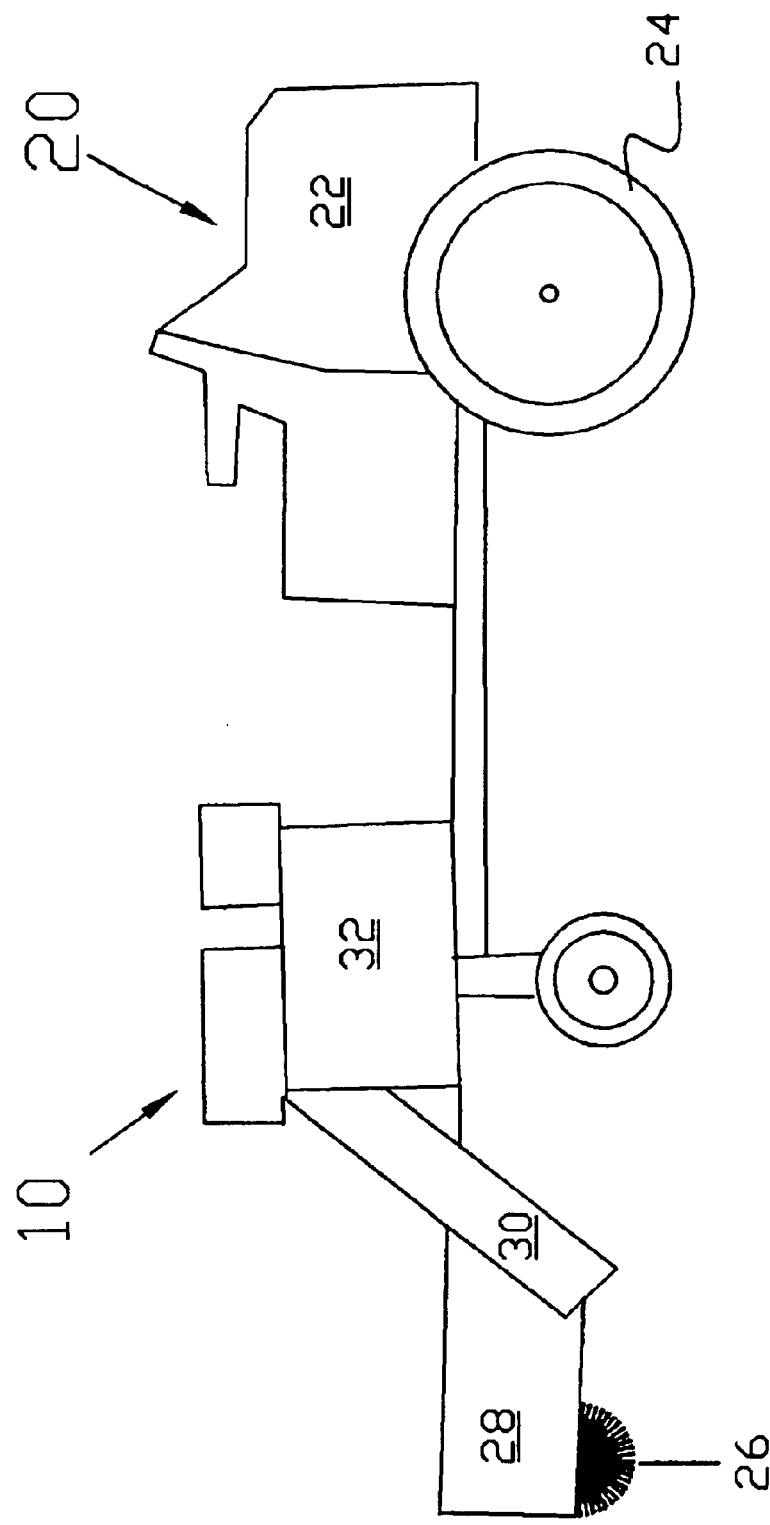
FIG. 1 is a side view of the leaf compacting and baling apparatus of the present invention attached to a prime mover.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to presently preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present invention cover such modifications and variations as come within the scope of the present features and their equivalents.

FIG. 1 depicts a side view of the leaf/debris collecting, crushing, and compacting and baling apparatus 10 of the present invention. The apparatus is attached to the front end of a prime mover 20. The prime mover 20 has an internal combustion engine 22 that provides power to drive its rear wheels 24 and to provide power to the hydraulic motors that run the various components of the present invention. The apparatus 10 has at least one leaf/debris gathering assembly 26, a leaf/debris crusher assembly 28, a leaf/debris conveyor assembly 30 and a leaf/debris baler assembly 32.

Figure 2:
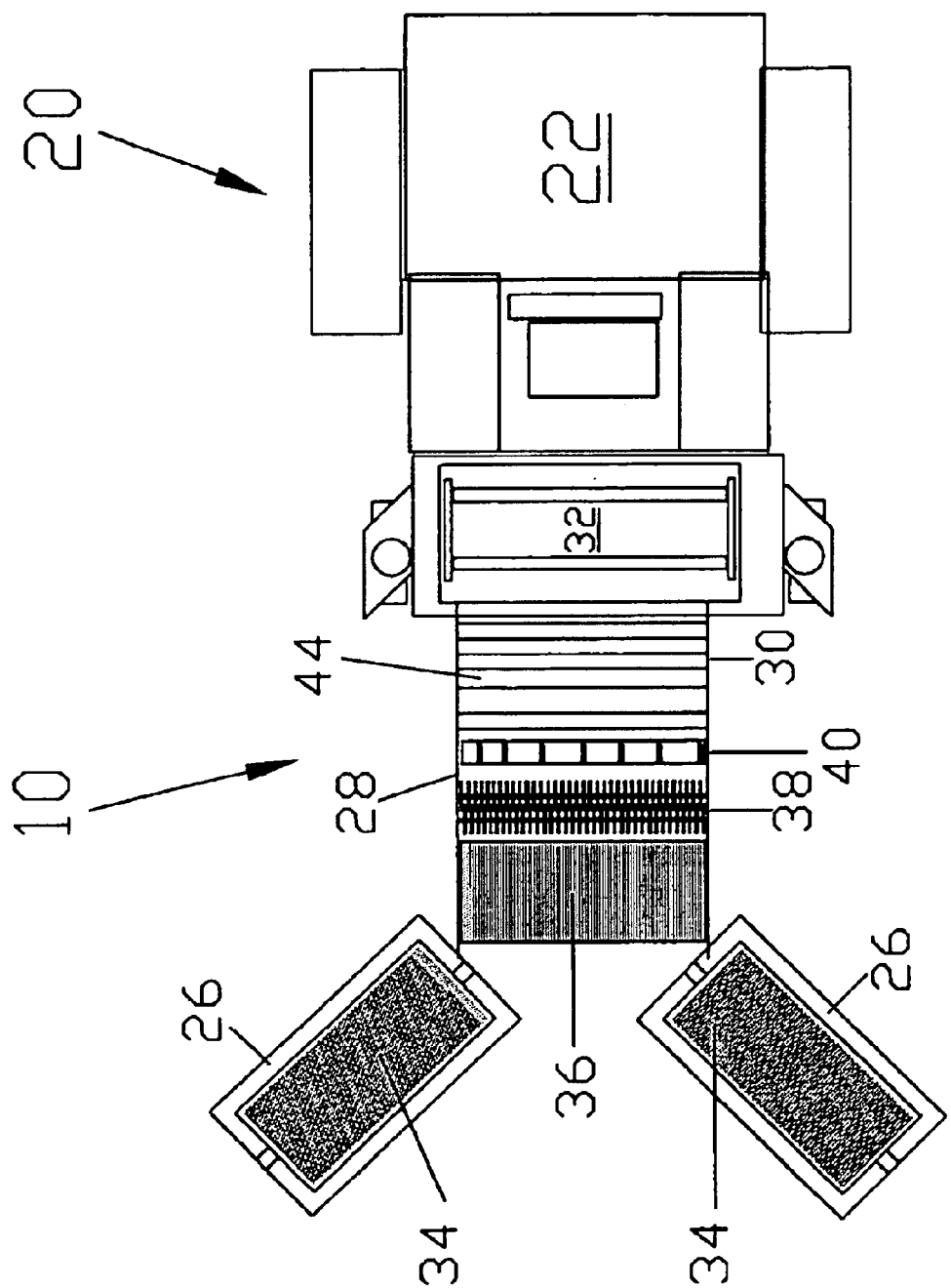
FIG. 2 is a top view of a first embodiment of the present invention attached to a prime mover.

As shown in FIG. 2, the apparatus 10 may include a plurality of debris-gathering assemblies 26. Such assemblies 26 may extend in a forward, diagonal direction at the front of the crusher assembly 28 (as shown) and may include debris-gathering brushes 34 mounted on respective brush frames. Debris-gathering assemblies 26 are supported at the front and back ends by rollers mounted to their brush frames. The debris-gathering assemblies 26, as well as a primary gathering brush 36 centrally located at the leading edge of the crusher assembly 28, feed the debris into the crusher assembly 28. The crusher assembly 28 consists of at least one pair of crushing rollers 38 and a scissoring roller 40. The crusher's rollers 38 and 40 are driven by a hydraulic motor and chain attached to the crusher assembly 28.

From the crusher assembly 28 the debris is fed onto a conveyor assembly 30. The conveyor assembly 30 has a continuous conveyor belt 44 supported by multiple rollers, and finger like projections 46 on said conveyor belt 44. The conveyor assembly 30 is supported at its front end by attachment to the crusher assembly 28 and brush frames and at its back end by attachment to the prime mover 20. Hydraulic motors power the plurality of brushes 34, the rotation of the crusher rollers 38 and 40 and also drive the conveyor belt 44.

The baler assembly 32 is located at the distal end of the conveyor belt 44. The baler assembly 32 consists of a fixed position baling roller 48 and a movable baling roller 50 (as best seen in FIGS. 7A–10B). The baling rollers 48 and 50 are contained within a continuous baling band 52. The baling assembly 32 is attached to the prime mover 20 by suitable framing. The compacting and baling apparatus 10 also has a baling material feed assembly that feeds baling material into the baling band 52. The baling material 72 binds and retains the crushed and compacted debris in a small, lightweight roll. The baler assembly 32 is capable of rotating to eject the completed bale by way of a hole 64 in the underside of the baler assembly 32 (as best seen in FIG. 8B).

FIG. 2 shows a diagrammatic top view of leaf compacting and baling apparatus 10 attached to a prime mover 20. Although leaf gathering brushes 34 extend forward of crusher assembly 28, they project at an angle from the crusher assembly 28, preferably about thirty-five degrees. The bottom (ground) edges of leaf gathering brushes 34 are rotated by hydraulic motors inward towards the center line of the crusher assembly 28 to gather leaves towards the primary gathering brush 36 which lifts them upwardly into the crusher assembly 28 as the prime mover 20 moves the apparatus 10 forward.

Figure 3:
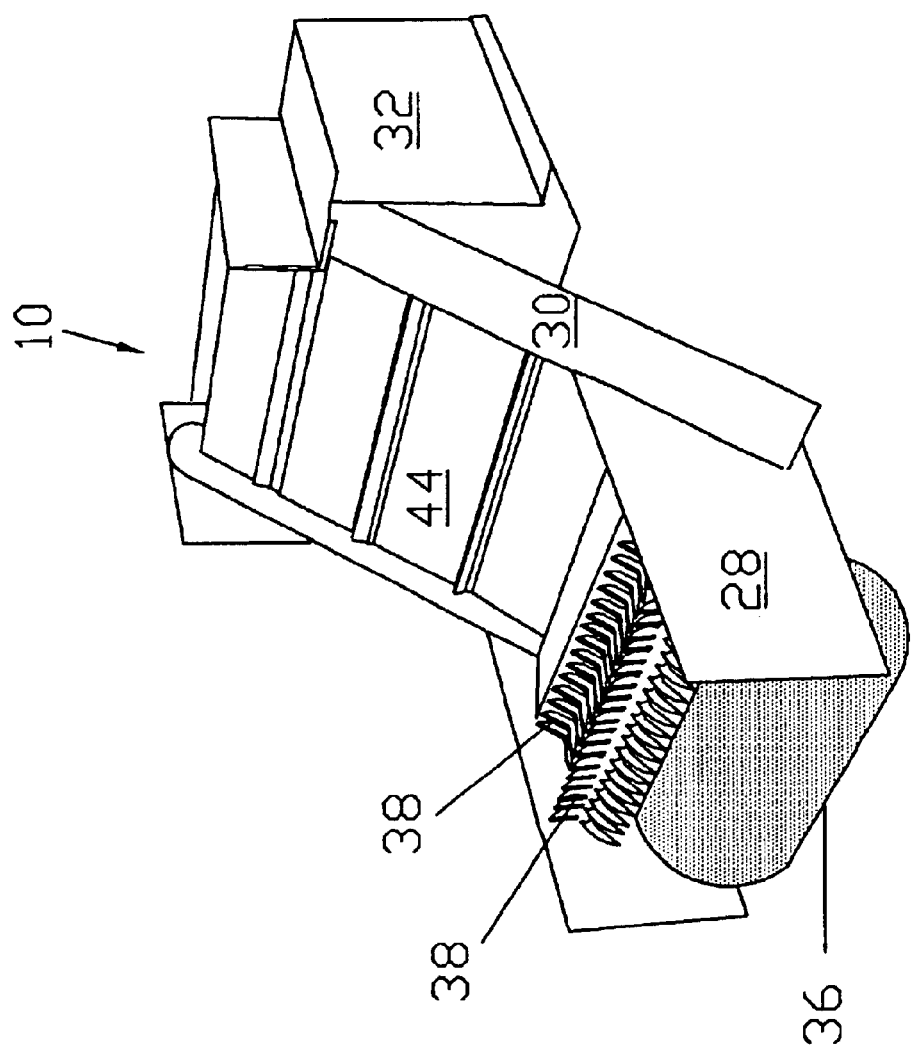
FIG. 3 is a perspective view of the embodiment of the present invention as depicted in FIG. 2.
Figure 4:
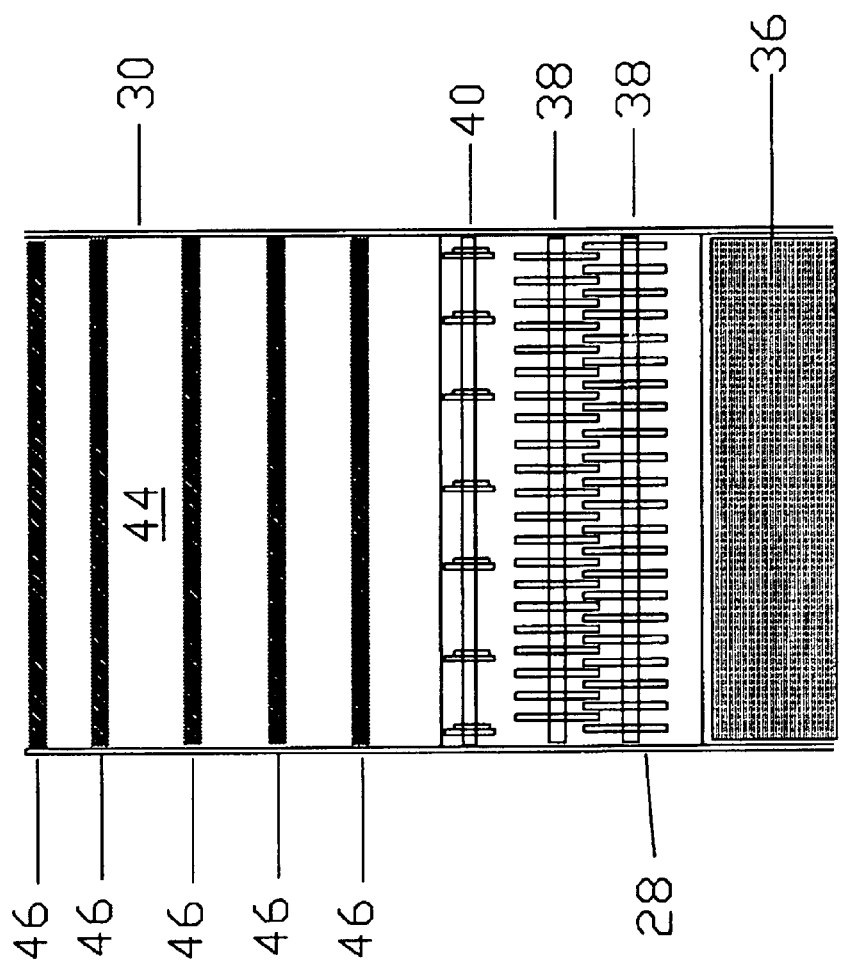
FIG. 4 is a top view of a first embodiment of the present invention showing a brush, the crusher assembly and the conveyor mechanism of the embodiment as depicted in FIG. 2.

As best seen in FIGS. 2–4, once gathered by the debris-gathering assemblies 26 toward the centerline of the crusher assembly 28, the leaves and other debris may be lifted into the crusher assembly 28 by the primary gathering brush 36, which similarly rotates so as to lift the debris and deposit it into the front of the crusher assembly 28. After passage through the crusher assembly 28, the now crushed leaves/ debris is deposited onto the conveyor belt 44. The continuous conveyer belt 44 of the conveyor assembly 30 includes numerous finger-like projections 46 for aiding in lifting the crushed debris up the inclined conveyor belt 44. These projections 46 lift the debris from the crusher assembly 28 to the conveyor belt 44 as they move from the underside of the conveyor assembly 30 to the topside. As the finger-like projections 46 move from the top to the bottom side of the conveyor assembly 30 they facilitate depositing the crushed debris into the baler assembly 32.

While the dimensions of the present invention form no particular aspect of the invention, the relative size of the various components may give rise to a better understanding of the capacity of the present invention to deal with a generally understood quantity of yard waste. To such end, the finger-like projections 46 of the conveyor assembly 30 may be generally between about 1 to 8 inches in length, most preferably about 2 inches in length and may be separated along the conveyor belt 44 generally between about 1 to 12 inches apart, most preferably about 8 inches apart. The debris-gathering brushes 26 may be between about 12 to 96 inches in length, most preferably about 24 inches, and generally between about 3 to 36 inches in diameter, most preferably about 12 inches in diameter. The upper surface of the conveyor belt 44 may be between about 24 to 96 inches in length, most preferably about 48 inches, and may be generally between about 12 to 96 inches in width, most preferably about 24 inches.

Figure 5A:
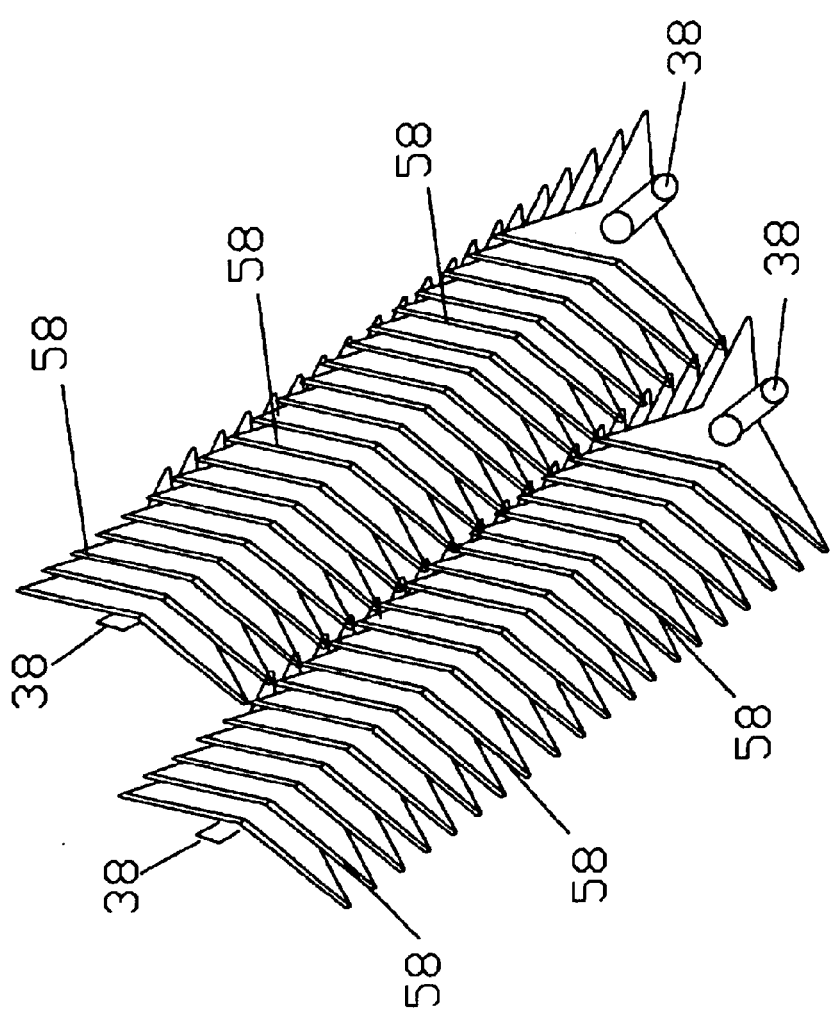
FIG. 5A is a perspective view of the crusher rollers of the crusher assembly.
Figure 5B:
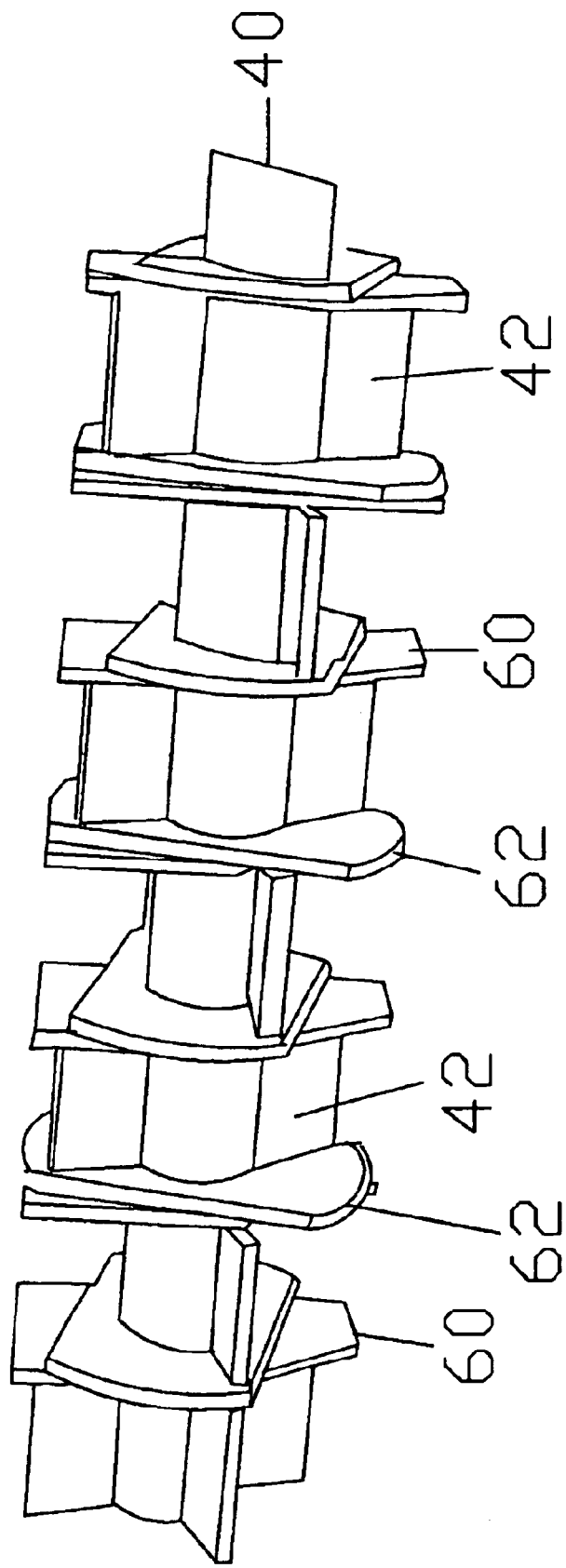
FIG. 5B is a perspective view of the scissoring roller of the crusher assembly.

FIGS. 5A and 5B depict an exemplary pair of crushing rollers 38 and a scissoring roller 40 of the crusher assembly 28, respectively. The leaves/debris from the debris-gathering assemblies 26 and 36 are passed to the crushing rollers 38 of FIG. 5A. The crushing rollers 38 may have multiple crushing vanes 58. The crushing vanes 58 on one member of the roller pair 38 mesh with the crushing vanes 58 of the other member of the roller pair 38 as they rotate in the same direction, but do not touch. The leaves/debris are passed through the crushing vanes 58. That part of the debris small enough to pass under the vanes 58 is pushed rearward to the scissoring roller 40. The remainder of the leaves/debris are caught by the sharp edges of the crushing vanes 58 and circulated therethrough. The crushing vanes 58 will crush leaves, sticks, and other debris as the crushing rollers 38 rotate in the same direction and the leaves/debris pass through the crushing vanes 58. Eventually the processed leaves/debris are small enough to pass under the crushing vanes 58 and are passed on to the scissoring roller 40 by the in-coming debris. In other words, the system is essentially self-feeding.

The scissoring roller 40, as depicted in FIG. 5B, is particularly effective in reducing the size of any fibrous debris material such as pine straw that was passed over by the crushing rollers 38. The scissoring roller 40 is provided with a plurality of stationary cutting vanes 60. Each of such cutting vanes 60 is associated with a corresponding rotating cutting vane 62 on the scissoring roller 40. The plurality of paired vanes 60 and 62 on the scissoring roller 40 act as a plurality of scissors for cutting any material passed through them. Once passed through the scissoring roller 40 of the crusher assembly 28, the leaves/debris is then passed onto the conveyor belt 44 of the conveyor assembly 30 for transport to the baler assembly 32 for compaction and baling by the dispensing paddles 42 attached to the shaft of the scissoring roller 40 and which are interdigitated between each of the stationary and rotating pairs of cutting vanes 60 and 62.

Figure 6A:
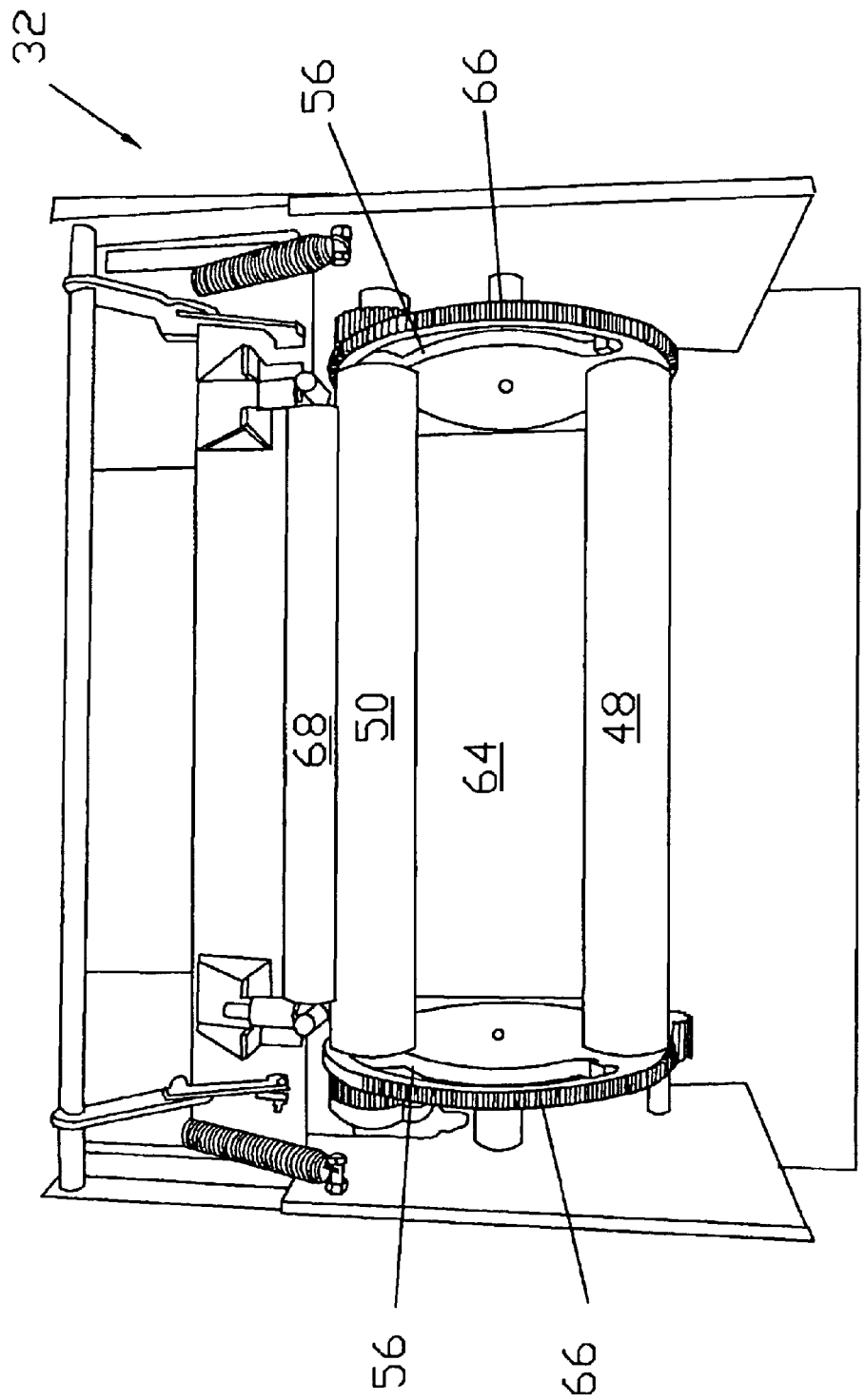
FIG. 6A is a top view of the baler assembly of the present invention in an open position without the continuous band.
Figure 6B:
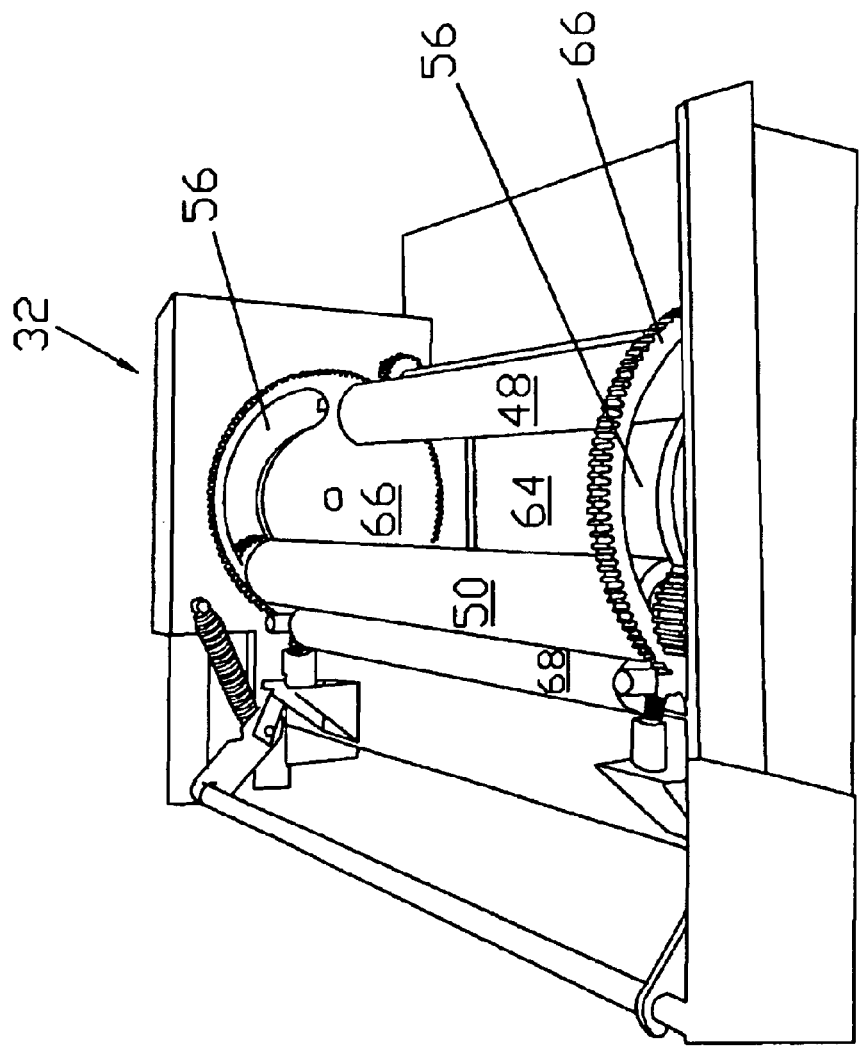
FIG. 6B is a right side perspective view of the baler assembly of the present invention in an open position without the continuous band.

FIGS. 6A and 6B illustrate a top and a side perspective view of the baler assembly 32 of the present invention without the continuous band 52 that contains the crushed debris to be compacted and baled. As illustrated, the baler assembly 32 is in an open configuration awaiting the deposit of crushed material from the crusher assembly 28 via the conveyor assembly 30. As can best be seen in FIG. 6B, the baler assembly 32 comprises a fixed baling roller 48 and a movable baling roller 50. Each end of the movable baling roller 50 passes through an opening 56 in its respective one of a set of paired main drive gears 66. The pair of main drive gears 66 is primarily responsible for maintaining apart or bringing together the fixed and movable baling rollers 48 and 50 during the receipt and compacting/baling of crushed debris, respectively. Additionally, the main drive gear 66 is used to rotate the entire baler assembly 32 so as to expel the baled material through an opening 64 in the underside of the baler assembly frame.

The fixed baling roller 48 is affixed to the paired main drive gears 66 of the baler assembly 32 and move with the paired main drive gears 66 as they rotate. Generally, when the fixed baling roller 48 is at or near the front of the baler assembly 32, the baler assembly 32 is considered in the open position, as shown in FIGS. 6A and 6B. When the fixed baling roller 48 is at or near the rear of the baler assembly 32, it is in a dosed configuration.

Figure 7A:
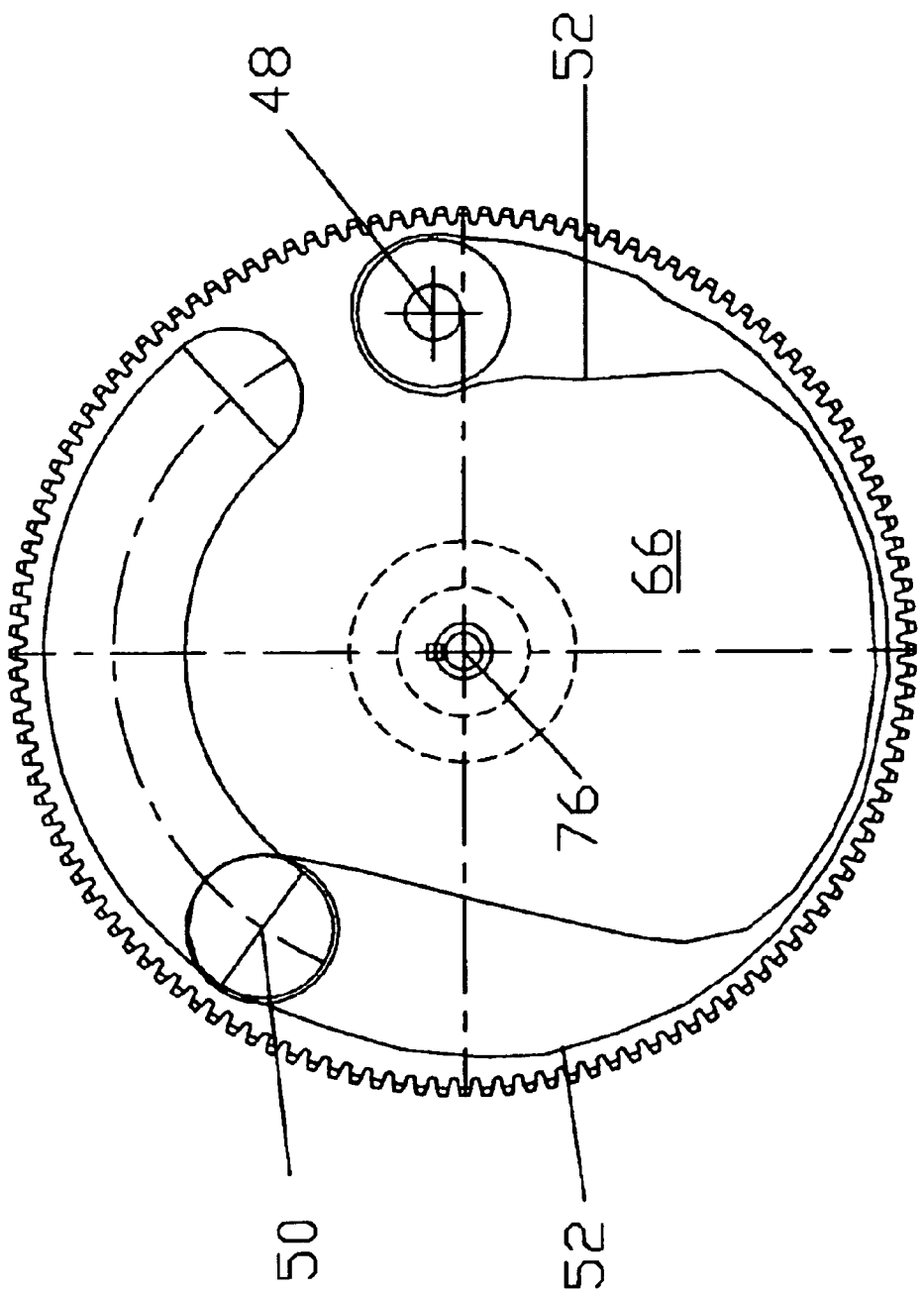
FIG. 7A is a side view of the main drive gear of the baler assembly including the baling rollers and the continuous band in an open position.

The baling rollers 48 and 50 are contained within a continuous baling band 52. FIG. 7A shows continuous baling band 52 in position on the baling rollers 48 and 50 in the open position. It is in this configuration that the baler assembly 32 receives the crushed leaves/debris from the conveyor mechanism 30 into the continuous band 52. When the baling rollers 48 and 50 rotate on their horizontal axes the continuous band 52 similarly rotates in an identical direction. This is facilitated by the presence of a spring-biased friction roller 68 that introduces and maintains a sufficient amount of friction so as to ensure the movement of the continuous band 52 in coordination with the movement of the baling rollers 48 and 50. It is this movement, along with the closure of the band 52 (by way of the closure of the baling rollers 48 and 50), that causes compaction of the crushed debris.

Figure 7B:
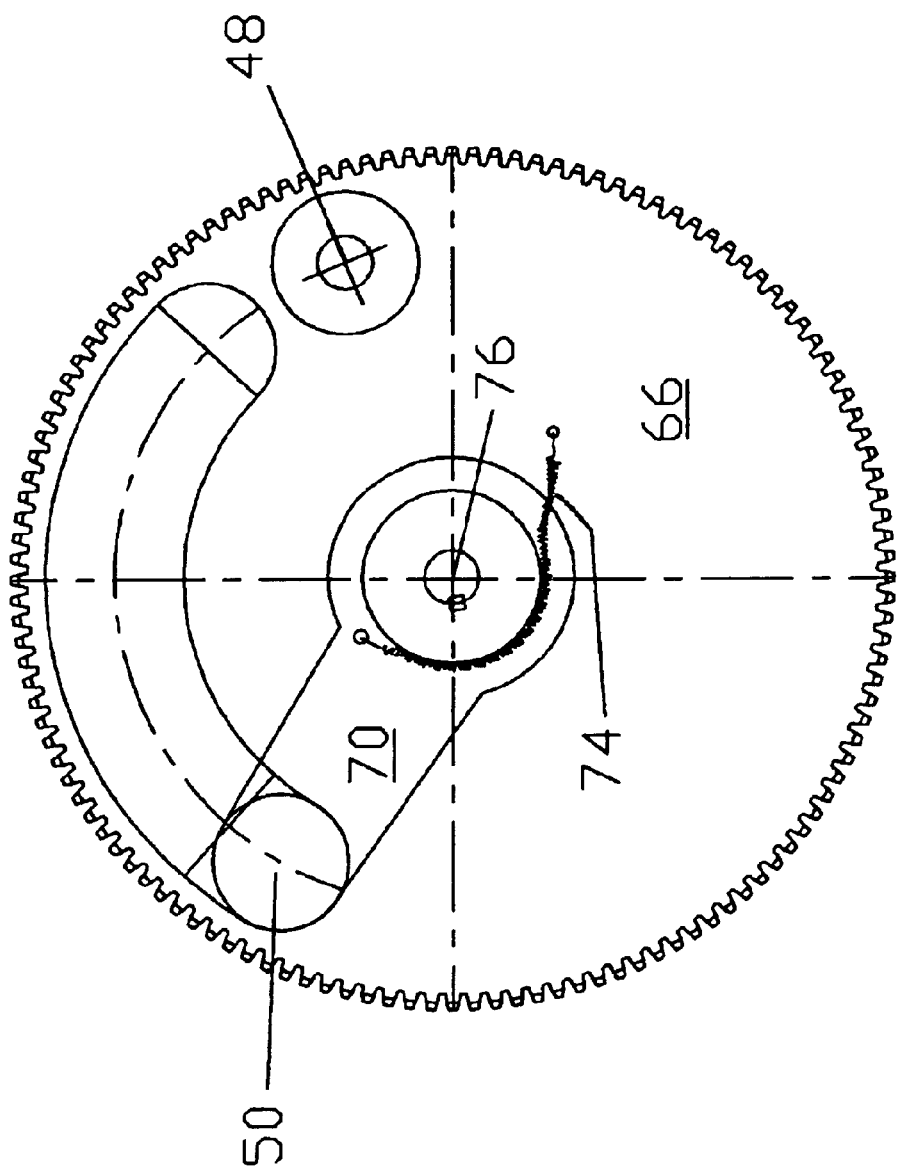
FIG. 7B is a side view of the main drive gear of the baler assembly including the baling rollers with the spring-loaded positioning arm holding the moveable baling roller in the open position.

FIG. 7B more clearly depicts the spring mechanism 74 that aids positioning arm 70 in maintaining the moveable baling roller 50 in it open position. The positioning arm 70 and the biased spring mechanism 74 aid in keeping the moveable baling roller 50 in position as main drive gear 66 rotates counterclockwise to bring fixed baling roller 48 toward moveable baling roller 50 in a closed configuration as best seen in FIG. 9B.

Figure 8A:
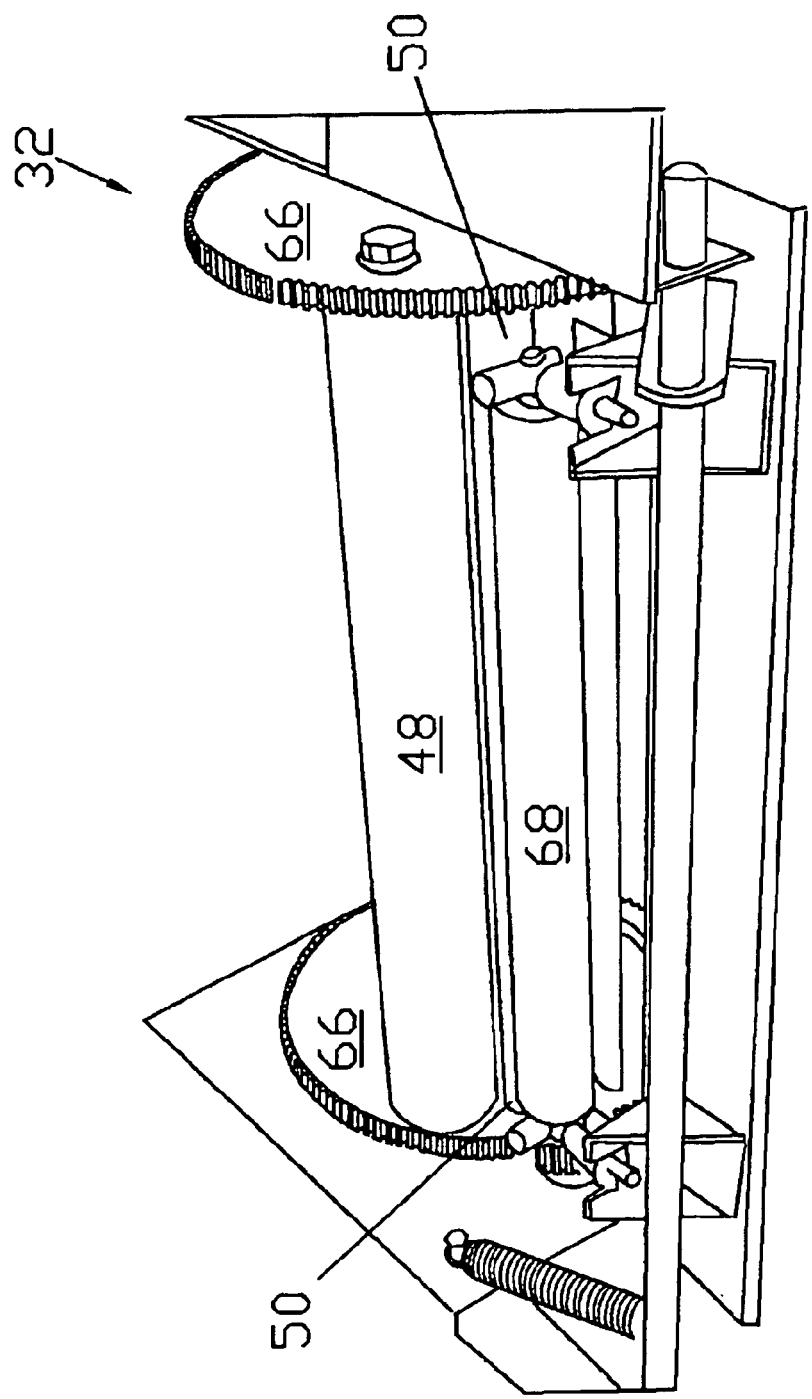
FIG. 8A is a rear perspective view of the baler assembly of the present invention in a closed position as seen without the continuous baling band.

FIGS. 8A and 8B depict 2 rear and side perspective views of the baler assembly 32 in its closed and compacting configuration without the continuous baling band 52. As can be seen the main drive gears 66 have been rotated counter-clockwise to bring the fixed baling roller 48 into communication with the movable baling roller 50 thus closing the baler assembly 32. As before mentioned, closing baler assembly 32 compresses and further compacts the crushed leaves/debris. The fixed baling roller 48 is free to rotate about its horizontal axis. A hydraulic motor and chain drive the movable baling roller 50. As the movable baling roller 50 is rotated, the continuous baling band 52 rotates in the same direction. The crushed compressed leaves also rotate but in the opposite direction of baling rollers 48 and 50.

Figure 9A:
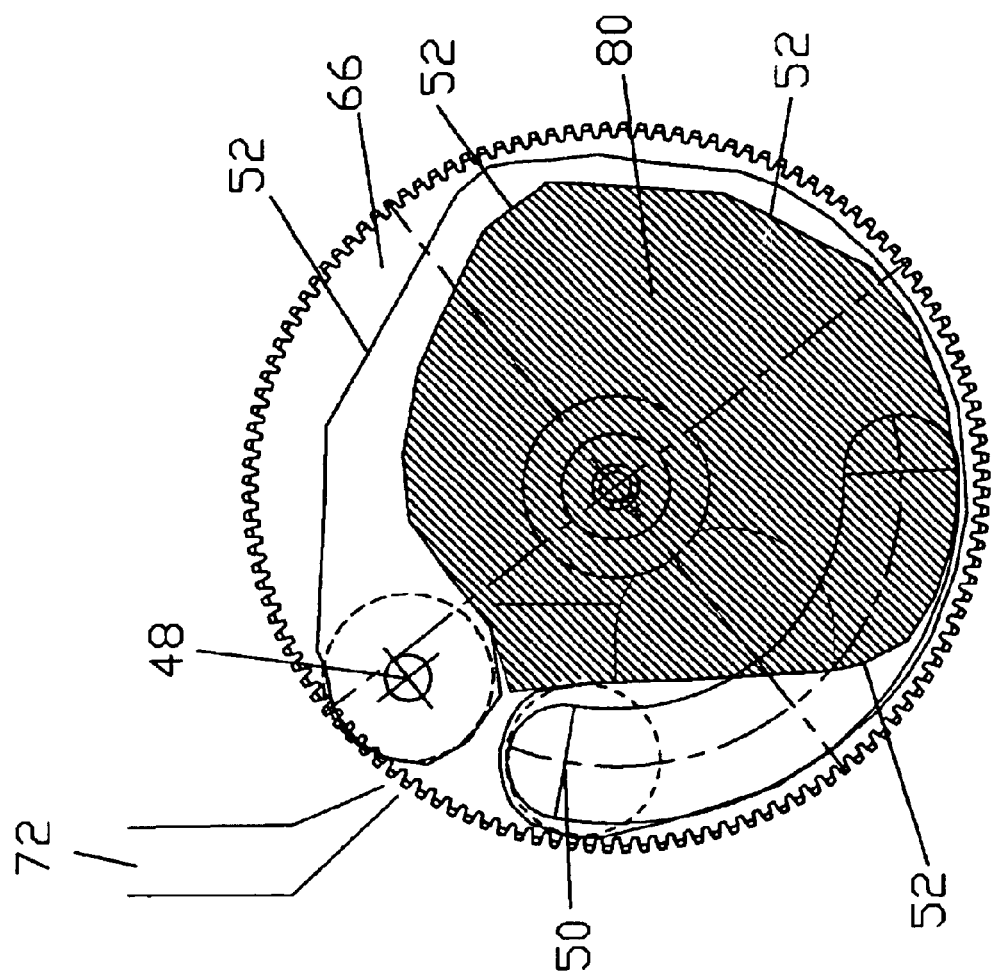
FIG. 9A is a side view of the main drive gear of the baler assembly including the baling rollers, the continuous band in a closed position and the debris within the band for compacting and baling.

FIG. 9A further illustrates the containment of the crushed leaves/debris within the continuous baling band 52 while the baler assembly 32 is in a closed configuration. Baling material 72, including, but not limited to, paper, may be inserted into the rotating baling band 52 between closed baling rollers 48 and 50 to surround the crushed compressed leaves/debris. Through friction alone, the baling material 72 is maintained along the continuous baling band 52 and thus encircles the crushed, compacted leaves/debris. In so doing, the leaves/debris is baled.

Figure 9B:
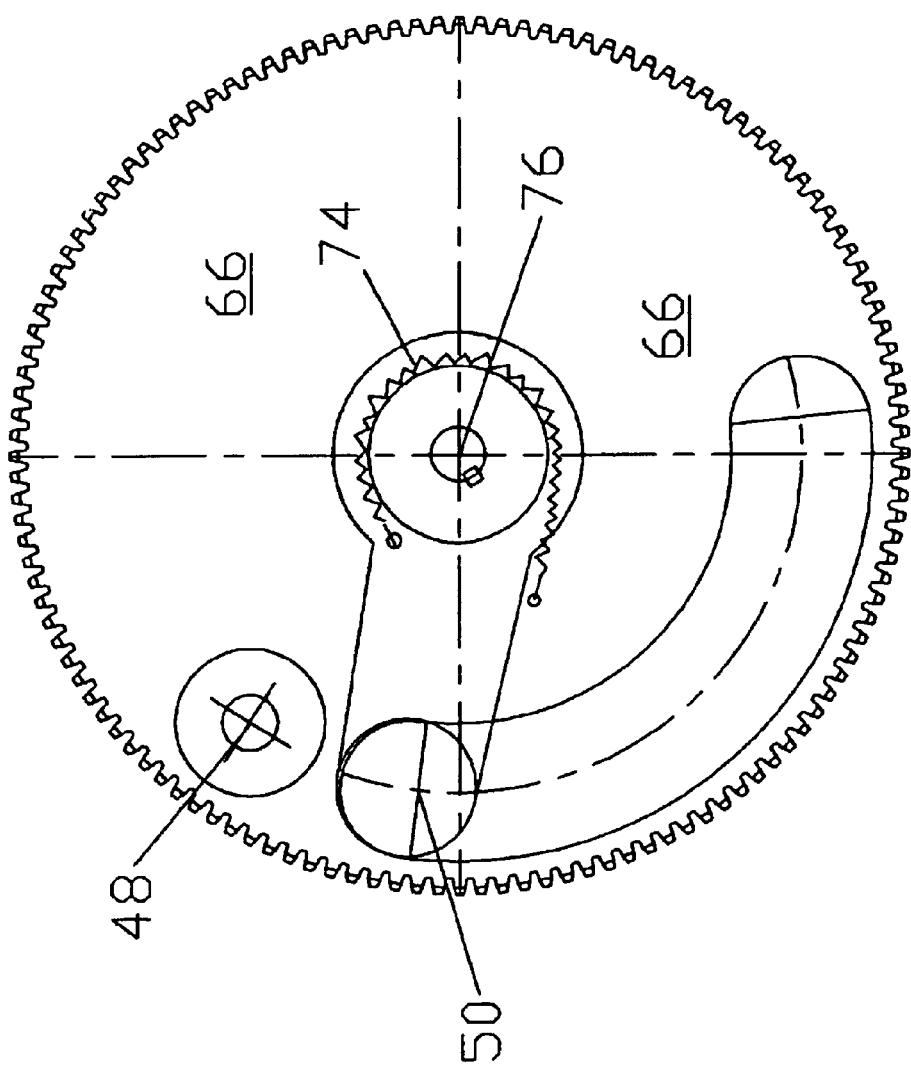
FIG. 9B is a side view of the main drive gear of the baler assembly including the baling rollers with the tensioned spring-loaded positioning arm allowing the moveable baler roller to be in the closed position.

FIG. 9B shows that the movable baling roller 50 is biased toward the closed position. When inverted (i.e., when the baler assembly 32 is rotated to expel a bale of crushed and compacted leaves/debris) the movable baling roller 50 is similarly biased toward the closed position. This is to ensure a more secure compaction, as well as for safety during the baling process. A spring-biased positioning arm 70 connects the movable roller 50 to the central axis of the main drive gears 66. Such positioning arm 70 aids in maintaining the proper motion of the movable roller 50 relative to the fixed roller 48 and the main drive gears 66 during operation of the apparatus 10.

Figure 10A:
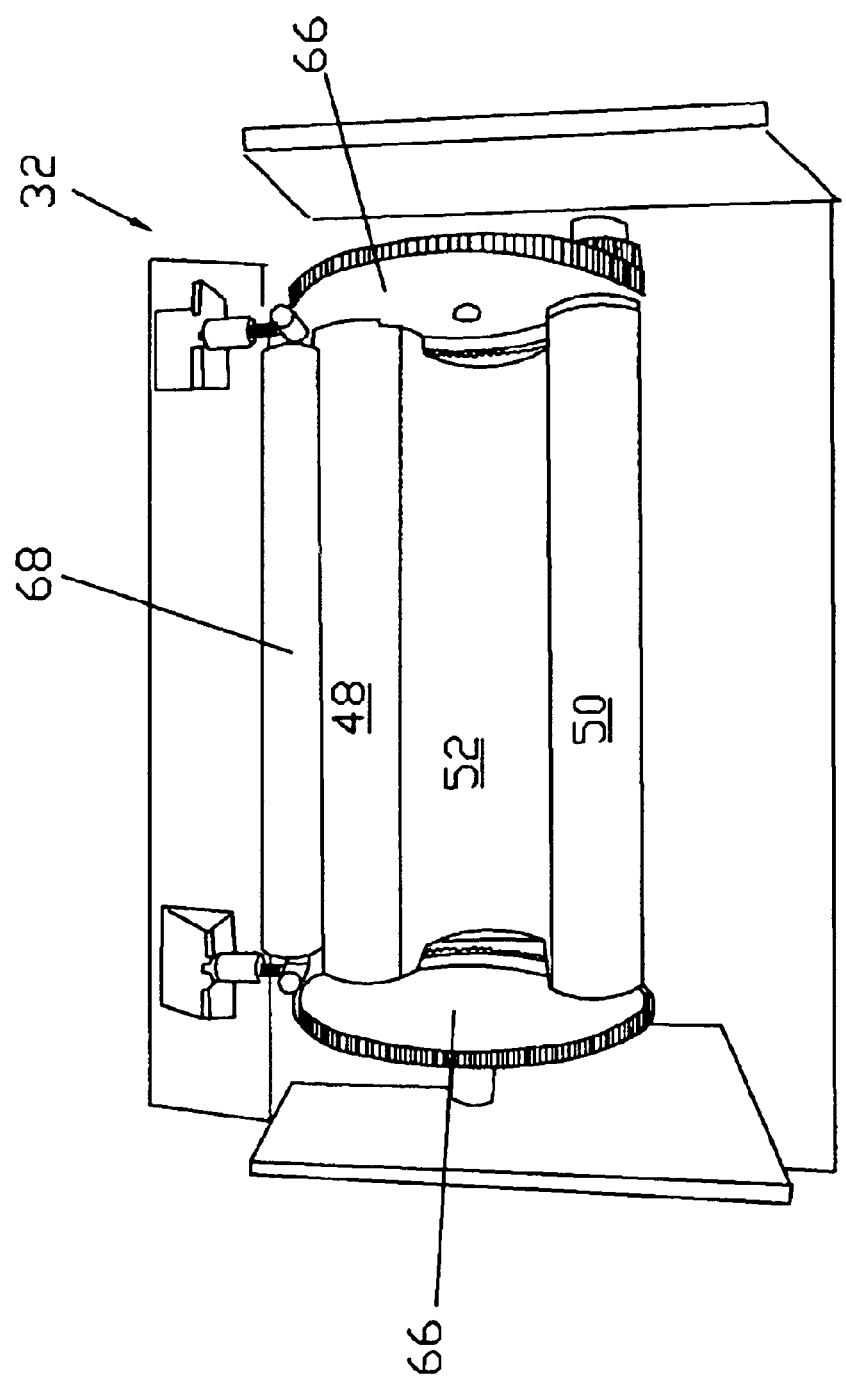
FIG. 10A is a top view of the baler assembly of the present invention in the dumping position.

With the crushing, compaction and baling of the leaves/debris complete, there remains but one function for the apparatus 10 to perform—the expulsion of the baled material from the baler assembly 32. FIG. 10A depicts a top view of the baler assembly 32 with the continuous baling band 52 in a dumping configuration (i.e., baling rollers 48 and 50 nearer bottom of baler assembly 32 and no material within the continuous baling band 52). In this orientation, the baler assembly 32 has been rotated almost 180 degrees about the central axis of the main drive gears 66 so as to allow the opening of the baling rollers 48 and 50 to expel the baled material through an opening 64 in the bottom of the baler assembly 32.

Figure 10B:
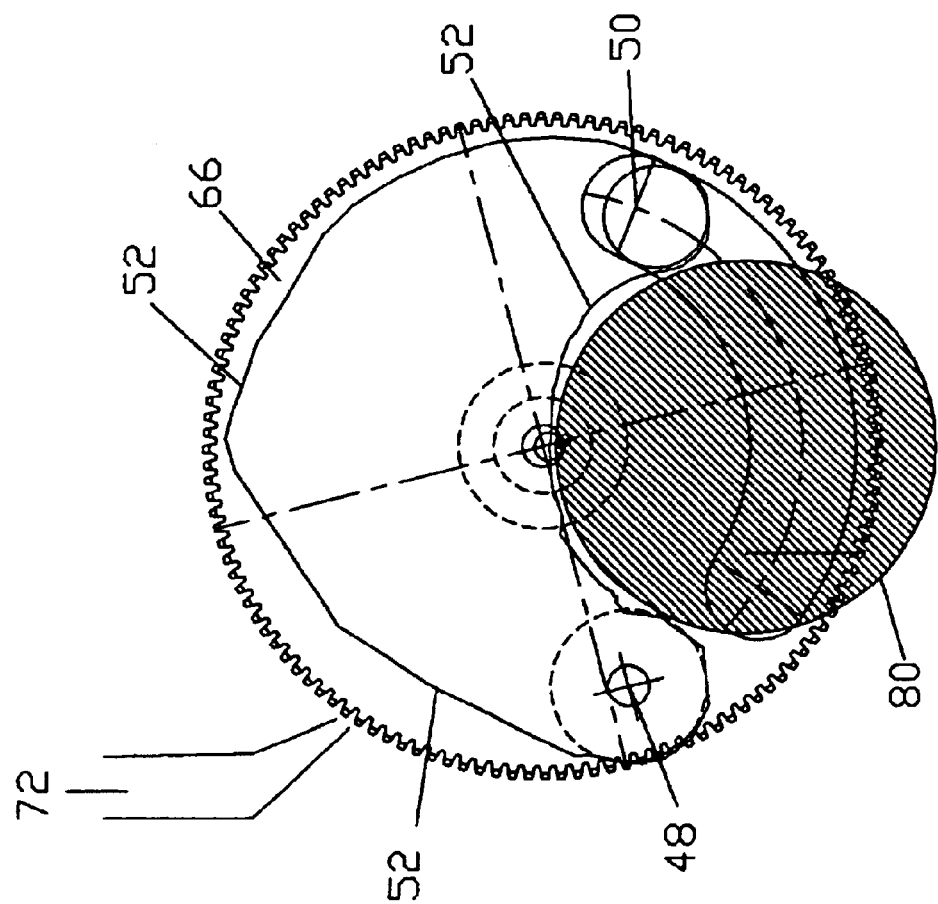
FIG. 10B is a side view of the main drive gear of the baler mechanism including the baler rollers and the continuous band in an open dumping position expelling a bale of leaves and other debris.

A motor (not shown) drives one of the paired main drive gears 66. These powered main drive gears 66 have a track that moves movable baling roller 50 along its opening 56 as the main drive gears 66 rotate the baler assembly 32. The opposing side of the baler assembly 32 houses a reversable motor that turns a gear on the end of the movable baling roller 50. This reversible motor rotates movable baling roller 50, which in conjunction with spring-biased friction roller 68, rotates the continuous baling band 52 and the fixed baling roller 48. As shown in FIG. 10B, the powered main drive gears 66 similarly are engaged to rotate the entire assembly 32 in a closed position to face downward. Once rotated, the positioning arm 70 may aid in realigning the movable baling roller 50 so as to open the baler assembly 32. The baled leaves/debris simply fall out of baler assembly 32. The expelled bales 80 can fall to the ground or can fall into a bale catcher. The dimensions of the bale are, preferably, about 24 inches in length and about 8 inches in diameter. The baling material 72 is, preferably, paper. Such paper may have one end prepared with an adhesive for sealing said bales 80.

Although a preferred embodiment of the invention has been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged both in whole or in part. Therefore, the spirit and scope of the appended claims should not be limited to the description of the preferred version contained herein.

I claim:

1. A leaf and yard debris collection and baling apparatus, comprising:
   a) at least one brush for gathering said leaves and yard debris, said brush rotatably connected to a frame of said apparatus and rotating so as to direct said leaves and yard debris along the centerline of said apparatus;
   b) a crusher assembly, said crusher assembly comprising at least one pair of crushing rollers rotatably connected to said frame of said apparatus, each of said crushing roller further comprising a plurality of crushing vanes,
      a scissoring roller rotatable connected to said frame of said apparatus, said scissoring roller comprising a plurality of paired scissoring vanes, wherein one of each said plurality of paired scissoring vanes is stationary and its paired scissoring vane rotates with said scissoring roller to generate a scissoring action, and
      a plurality of paddles rotatably connected to said frame of said apparatus and interleaved between each of said plurality of paired scissoring vanes;
   c) a conveyor assembly, said conveyor assembly comprising a conveyor belt, said conveyor belt including a plurality of finger-like projections to aid in maintaining said crushed leaves and yard debris on said conveyor belt;
   d) a baling assembly, said baling assembly comprising a fixed baling roller,
      a moveable baling roller, wherein each of said fixed and moveable baling rollers are rotatably connected to said frame of said apparatus and
      a continuous baling band located about said fixed and moveable baling rollers, and
      wherein said fixed and moveable baling rollers serve to admit and maintain said crushed leaves and yard debris within said continuous baling band for additional compaction and baling.

2. The apparatus of claim 1, wherein said apparatus comprises at least three brushes: a primary brush and two secondary brushes and wherein said primary brash lies at the proximal end of said crushing assembly and such other gathering brushes are set at an angle to said apparatus' centerline so as to direct said leaves and yard debris toward the primary brush.

3. The apparatus of claim 1, wherein said crushing rollers rotate in the same direction.

4. The apparatus of claim 3, wherein said paddles serve to expel said crushed leaves and yard debris onto said conveyor belt for transportation to said baler assembly.

5. The apparatus of claim 4, wherein said fixed baling roller is affixed at each end to a pair of main drive gear assemblies and each end of said moveable baling roller passes through an opening in one of said paired main drive gear assemblies, and wherein said baling assembly is opened and closed through the rotational motion of said main drive gear assemblies which either separate or bring together said fixed and moveable baling rollers, respectively.

6. The apparatus of claim 5, wherein a spring-biased friction roller holds the continuous baling band tightly against the moveable baling roller and wherein as respective one of said baling rollers rotate about their respective axes, said spring-biased friction roller ensures said continuous baling band similarly rotates about said baling rollers.

7. The apparatus of claim 6, wherein upon receipt of said leaves and yard debris, said paired main drive gear are rotated so as to bring said fixed and moveable baling rollers together and close said continuous baling band about said leaves and yard debris and wherein baling material is introduced between said fixed and moveable baling rollers into said leaves and yard debris so as to bale it within said baling material.

8. The apparatus of claim 7, wherein said paired main drive gears are capable of rotating the baler assembly such that moving said fixed and moveable baling rollers apart allows the baled leaves and yard debris to fall out of said baler assembly.

9. A yard waste gathering and baling apparatus, comprising:
   a) a crusher assembly; wherein said crusher assembly comprises at least one pair of crusher rollers, each of said rollers having a corresponding set of interdigitating crushing vanes which rotate in the same direction and at least one scissoring roller, wherein said scissoring roller has a plurality of paired scissoring vanes and wherein one of each of said paired scissoring vanes is stationary and its corresponding vane rotates with said scissoring roller;
   b) a baling assembly, wherein said baling assembly further comprises a continuous baling band for receipt of said crushed yard waste and wherein said yard waste is compacted and baled within said band; and
   c) wherein both of said crusher and baling assemblies are affixed within a frame of said apparatus.

10. The apparatus of claim 9, wherein said apparatus further comprises a plurality of brushes for gathering said yard waste.

11. The apparatus of claim 9, wherein said crusher assembly further comprises at least one scissoring roller with a plurality of paired fixed and rotatable scissoring vanes.

12. The apparatus of claim 11, wherein said baling assembly further comprises a fixed baling roller and a moveable baling roller within said continuous baling band for use in both maintaining open or closing said band, as well as, translating rotational motion to said band.

13. The apparatus of claim 12, wherein said rotational motion is translated to said continuous baling band by said fixed and moveable baling rollers with the aid of a spring-biased friction roller, wherein said continuous baling band is moved between said rotating fixed baling roller and said spring-biased friction roller.

14. The apparatus of claim 13, wherein fixed and moveable baling rollers may be brought together to close said continuous baling band about said crushed yard waste and wherein baling material may be introduced into said closed continuous band so as to bale said yard waste within said rotating continuous baling band.

15. The apparatus of claim 14, wherein said baling assembly may rotate to expel the baled yard waste through an opening in the bottom of the assembly.

16. A method of compacting and baling leaves and yard debris, comprising the steps of:
   a) gathering said leaves and yard debris;
   b) crushing said leaves and yard debris in a crusher assembly, wherein said crusher assembly comprises at least one pair of crushing rollers, each of said rollers having a plurality of paired and corresponding crushing vanes and at least one scissoring roller, said scissoring roller having a plurality of paired scissoring vanes, wherein one of each of said paired scissoring vanes is stationary and its corresponding vane rotates with the scissoring roller;
   c) depositing said crushed leaves and yard debris into a baler assembly;
   d) compacting said crushed leaves and yard debris within a rotating continuous baling band; and
   e) inserting baling material into said rotating band to bale said crushed leaves and yard debris.

17. The method of claim 16, further comprising the step of providing within said rotating continuous baling band both a fixed and a moveable baling roller.

18. The method of claim 17, wherein said baling rollers together with a spring-biased friction roller serve to introduce rotational motion to said rotating continuous band.

* * * * *